United States Patent [19]

Chabat-Courrède et al.

[11] 4,364,541
[45] Dec. 21, 1982

[54] ISOLATING DEVICE FOR CALIBRATED SAFETY VALVE

[76] Inventors: Jean Chabat-Courrède, 31 Rue du Docteur Emile Bergeron, 77250 - Moret-sur-Loing; François Gemignani, 14 Lotissement du Pati, 13500 - Martigues, both of France

[21] Appl. No.: 164,908
[22] Filed: Jul. 1, 1980

[30] Foreign Application Priority Data

Apr. 2, 1980 [FR] France .................. 80 07459

[51] Int. Cl.³ .............................. F16K 31/48
[52] U.S. Cl. ....................... 251/83; 74/424.8 VA; 251/83; 251/267; 251/335 B
[58] Field of Search .......... 74/25, 89.15, 424.8 VA; 251/14, 82, 83, 77, 267, 54, 330, 335 A, 335 B

[56] References Cited

U.S. PATENT DOCUMENTS

| | | | |
|---|---|---|---|
| 1,146,723 | 7/1915 | Losh | 251/83 |
| 1,427,111 | 8/1922 | Knudsen | 251/54 |
| 1,541,757 | 6/1925 | Allen | 251/83 |
| 1,582,938 | 5/1926 | Smith | 251/83 |
| 3,198,034 | 8/1965 | DeWitte et al. | 251/14 |
| 3,589,671 | 6/1971 | Strache | 251/83 |
| 4,072,163 | 2/1978 | Byrnes | 251/54 |

Primary Examiner—George L. Walton

[57] ABSTRACT

Isolating device for positioning in a circuit upstream of the safety valve, wherein it comprises a valve member which can sealingly bear on a valve seat formed in the said circuit, neutralization means which normally maintain the valve member remote from its seat, said means being actuatable to bring the valve member in sealing engagement with its seat when it is necessary to isolate the safety valve and calibration means acting on the valve member when it is sealingly engaged with its seat to enable it to move away from the latter when the pressure upstream of the isolating device exceeds a determined value.

3 Claims, 3 Drawing Figures

ISOLATING DEVICE FOR CALIBRATED SAFETY VALVE

BACKGROUND OF THE INVENTION

The present invention relates to an isolating device for a calibrated safety valve for positioning in a circuit upstream of a safety valve in order to isolate the latter should it remain accidentally locked in the open position.

Operating defects of safety valve on closing can have disastrous consequences, because they lead both to a pressure drop in the circuit which they are responsible for monitoring and to an uncontrolled escape of the fluid contained in the said circuit. This is in particular the case when such faults occur on certain valves equipping the primary cooling circuit of a nuclear power station. Thus, the failure to close of these valves can be looked upon as a breach of the primary circuit and this must be effectively remedied as rapidly as possible. Hitherto, no satisfactory solution of this problem is known.

Thus, although it is known to protect a discharge cock by placing a valve upstream thereof this solution cannot be used for protecting a safety valve for obvious safety reasons. Thus, merely isolating the defective valve would lead to the elimination of the protection of the overpressure circuit. Moreover, the same result would be obtained if the isolating valve was accidentally operated in normal operation.

BRIEF SUMMARY OF THE INVENTION

The object of the present invention is to solve the problem of isolating a defective safety valve without causing any risk for the installation to be protected.

The present invention therefore relates to an isolating device for positioning in a circuit upstream of the safety valve, wherein it comprises a valve member which can sealingly bear on a valve seat formed in the said circuit, neutralization means which normally maintain the valve member remote from its seat, said means being actuatable to bring the valve member is sealing engagement with its seat when it is necessary to isolate the safety valve and calibration means acting on the valve member when it is sealingly engaged with its seat to enable it to move away from the latter when the pressure upstream of the isolating device exceeds a predetermined value.

When the safety valve operates normally, the valve member remains remote from the seat under the action of neutralization means in such a way that the isolating device does not impede the flow of fluid. If the safety valve remains locked in the open position, a manual or automatic control of its neutralization means brings the valve member into sealing engagement with its seat and thus isolates the safety valve. The protection of the circuit against overpressure is then ensured by the calibration means which permit the raising of the valve member until the upstream pressure drops to an acceptable level. The discharge of the fluid then takes place through the defective safety valve downstream of the isolating device.

According to another feature of the invention the neutralization means comprise a mechanical system controlled by a motor. Preferably, the mechanical system comprises a first member integral with the valve member and a second member which moves in accordance with the displacement direction of the valve member under the action of said motor, a connection with clearance being provided between the said members in order to normally permit the second member to act on the first member so as to keep the valve member remote from its seat and to permit the first member to move with respect to the second member when the valve member moves away from its seat counter to the calibration means, when the pressure upstream of the isolating device exceeds the predetermined value after starting up the motor.

According to a first constructional variant of the invention the calibration means then comprise elastic means positioned between the first member and the second member.

According to a second constructional variant of the invention, each of the said members comprises a part in the form of a piston sealingly received in a bore so as to define the first tight chamber filled with hydraulic fluid which communicates with a second tight chamber into which is introduced a given volume of compressed gas defining the calibration means.

According to yet another feature of the invention, the isolating device also comprises a hydraulic shock absorber acting on the valve member at least when it is in sealing engagement with its seat in order to prevent swinging of the valve when it moves away from it seat counter to the calibration means as a result of an upstream pressure exceeding the predetermined value.

According to the first constructional variant of the invention referred to hereinbefore, each of the said members then comprises a part in the form of a piston sealingly received in a bore so as to define a first sealed chamber filled with hydraulic fluid which communicates with a second chamber by means of at least one diaphragm, the second chamber being partly filled with air which communicates with the atmosphere by means of at least one vent hole.

According to a second constructional variant of the invention referred to hereinbefore, the first chamber can then communicate with the second chamber by means of at least one diaphragm.

BRIEF DESCRIPTION OF THE DRAWINGS

The invention is described in greater detail hereinafter with reference to non-limitative constructional variants and with reference to the attached drawings, wherein show.

DETAILED DESCRIPTION OF THE PREFERRED EMBODIMENTS

Figure 1:
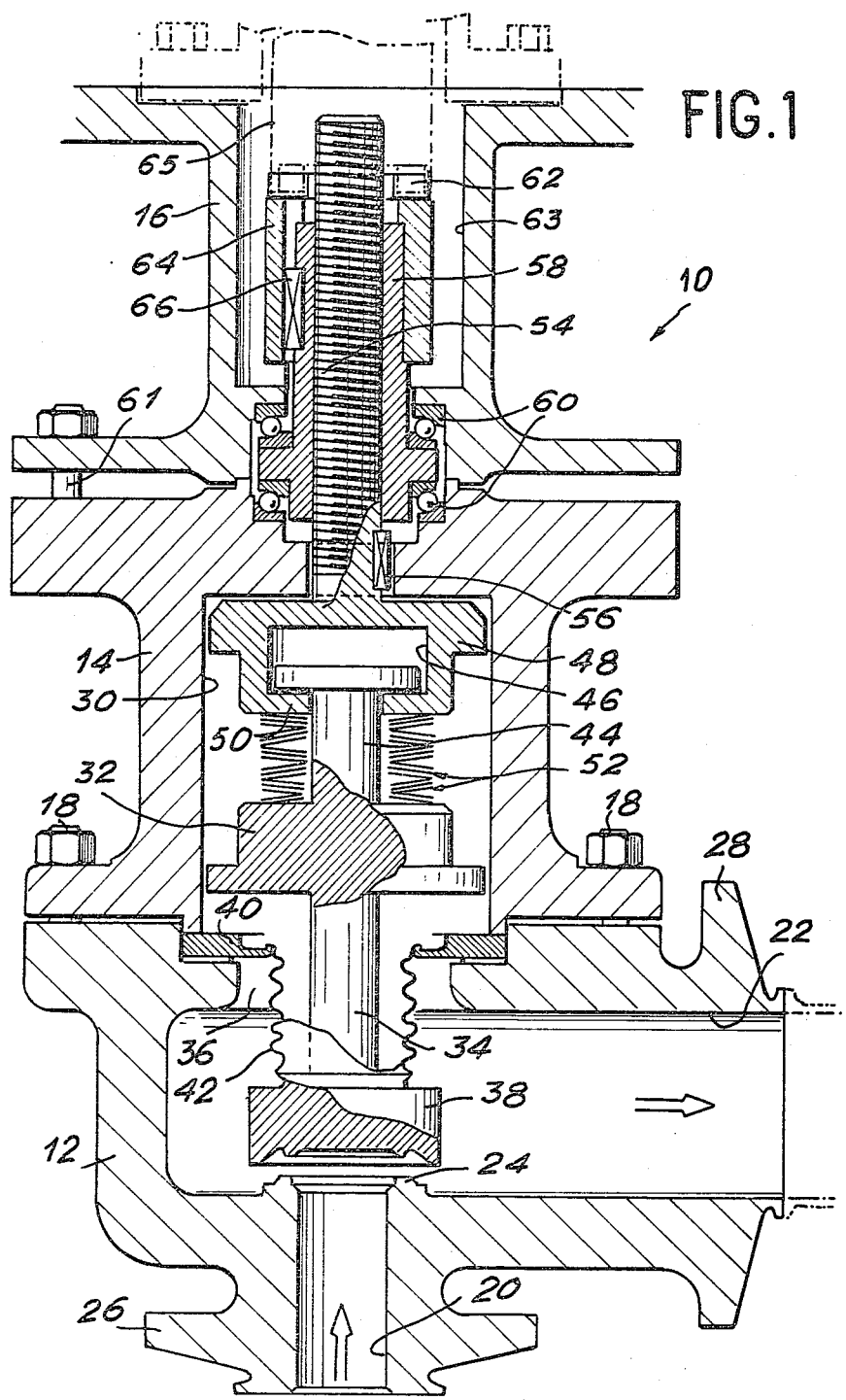
FIG. 1 a longitudinal sectional view of a first constructional variant of an isolating device according to the invention in which the valve member is calibrated by cupped washers.

The isolating device 10 shown in FIG. 1 comprises a casing having a plurality of parts 12, 14 and 16. The first part 12 of the casing is intended to be inserted in a not shown pipe upstream of the not shown safety valve to be protected. To this end, part 12 has a passage defined by a fluid intake port 20 and a fluid discharge port 22, the latter having a larger diameter and positioned at a right angle to port 20, in such a way that the latter issues into port 22, whilst forming on its periphery a valve seat 24. Moreover, part 12 of the casing is provided with flanges 26, 28 arranged around the ports 20, 22 so as to permit a connection of part 12 to the adjacent parts of the circuit.

Part 14 of the casing is fixed to part 12 by tie bolts 18 and is centered on the latter by a joggle of bevel shoulder in such a way that the axis of a bore 30 in part 14 is aligned with the axis of the intake port 20. A disk 32 is slidingly received within the bore 30 and has a projecting portion 34 extending through an opening 36 formed in part 12 of the casing so as to support by its end a valve member 38 facing the valve seat 24. A washer 40 gripped between casing parts 12 and 14 supports an end of a sealing bellows 42 arranged around the projecting portion 34 and whose other end is fixed to valve member 38.

On the side opposite to the projecting portion 34, disk 32 has a T-shaped portion 44, whose end is received in a recess 46 formed in a second disk 48 which is also slidingly mounted within the bore 30. The end of the T-shaped portion 44 is held within the recess 46 by a ledge 50 of disk 48. In the constructional variant of FIG. 1, elastic means are positioned between disks 32 and 48 and, more specifically, between disk 32 and ledge 50 in order to move the disks away from one another. These elastic means are constituted by a stack of spring washers 52. Obviously, these washers 52 could be replaced by any equivalent system, such as a helical spring.

Disk 48 is fixed to a rod 54, extending away from disk 32 through a reduced diameter portion of bore 30. Rod 54 and disk 48 are immobilised in rotation by a key 56 received in an appropriate keyway formed in part 14 of the casing. Rod 54 is threaded and receives a nut 58 which rotates within parts 14 and 16 of the casing and is immobilised in translation between said parts by thrust wall bearings 60. Casing part 16 is fixed to part 14 by means of tie bolts 61 and is centered on part 14 by a joggle or bevel shoulder in such a way that the axis of a bore 63 informed in part 16 is aligned with the axis of bore 30 and with the axis of intake port 20.

Bore 63 receives the free end of threaded rod 54 and a part of nut 58 on which is mounted a driving sleeve 64 integral in rotation with nut 58 by means of a key 66 fixed to the nut and received in an appropriate keyway formed in sleeve 64. As is diagrammatically shown in FIG. 1, casing part 16 defines at it upper end a flange for supporting a not shown driving motor, whose output shaft 65 rotates sleeve 65 via a dog system 62. It is apparent that the rotation of sleeve 64 rotates nut 58 due to key 66. As the nut 58 is immobilised in translation, between thrust ball bearings 60, whilst the threaded rod 54 is immobilised in rotation by key 56, there is a translation of rod 54 and disk 48 along the axis thereof. The displacement of disk 48 is transmitted to disk 52 and consequently to valve member 38 by the toleranced connection defined between the end of the key-shaped portions 44 and recess 46, said end being normally engaged with the ledge 50 under the action of spring washers 52. The thus formed mechanical system makes it possible to displace valve member 38 in accordance with the axis of intake port 20 during the operation of the motor, whose output shaft 65 is shown in FIG. 1.

The isolating device of FIG. 1 functions in the following way. Under normal operating conditions, i.e. when the safety valve positioned downstream of device 10 operates normally, the different parts of said device occupy the position shown in the drawing. Thus, the motor carried by the flange of casing part 16 maintains rod 54 and disk 48 in the upper position shown in FIG. 1 by means of sleeve 64 and nut 58. In this position, valve member 38 is moved away from its seat 24 as a result of the cooperation of the end of the key-shaped portion 44 with ledge 50 of disk 48.

When a defect of the safety valve leads to a locking thereof in the open position, the not shown motor can be controlled either automatically or manually in order to rotate sleeve 64 and nut 58 via a dog system 62. The corresponding rotation of nut 58 leads to the downward displacement (cf FIG. 1) of the assembly constituted by rod 54 and disk 48. During this displacement and as a result of the action of cupped washers 52, the head of the key-shaped portion 44 firstly remains in contact with washer 50 until valve member 38 sealingly engages with valve seat 24. The displacement of rod 54 and disk 48 continues to a limited extent in order to guarantee the effectiveness of the sealing contact between the valve member 38 and its seat 24. Thus, the sealing of intake port 20 by valve member 38 results from the action of the calibration means constituted by the cupped washers 52. Moreover, and as indicated hereinbefore, the respective dimensioning of recess 46 formed in disk 48 and the head of the T-shaped portion 44 received in said recess defines between the two moving members constituted by disks 32 and 48 a toleranced connection permitting the displacement of valve member 38 away from its seat 24 counter to the force exerted by the cupped washers 52 when the pressure in the circuit upstream of the isolating device 10 exceeds the value predetermined by the calibration of the washers.

Thus, the isolating device according to the invention permits automatic or manual intervention in the case of locking in the open position of the safety valve positioned downstream on the pipe, without eliminating the protection of the circuit relative to overpressures. Thus, the calibration of the cupped washers 52 can be such that it ensures the opening of the valve constituted by valve member 38 and seat 24 for a pressure equal to the opening pressure of the safety valve protected by device 10. It should be noted that the escape of fluid in the case of an overpressure upstream of device 10 takes place by the downstream-positioned safety valve, which by hypothesis is then in the open position.

Figure 2:
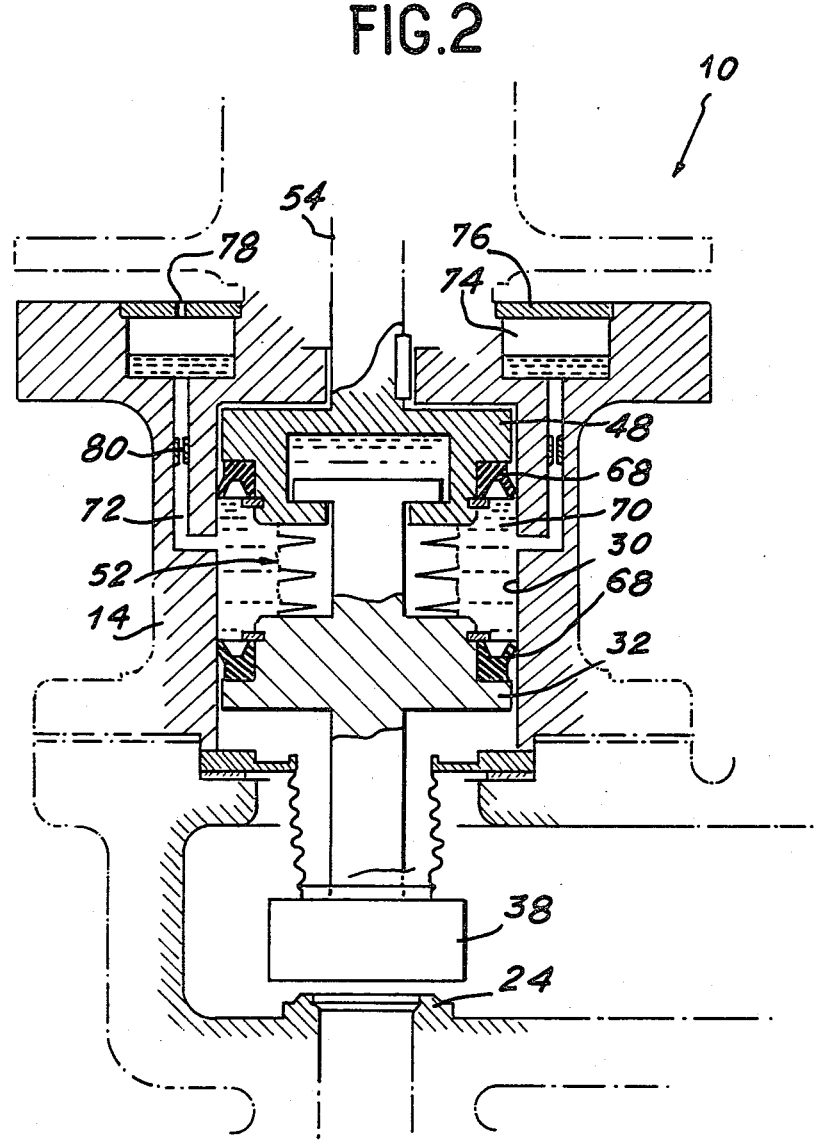
FIG. 2 a fragmentary longitudinal sectional view comparable to FIG. 1 showing an isolating device of the same type as that in FIG. 1, but also incorporating a hydraulic shock absorber for eliminating swinging of the valve.

The isolating device of FIG. 2 is identical to that of FIG. 1, but also comprises a hydraulic shock absorber making it possible to absorb or damp the swinging actions of the valve members when the latter is brought into sealing contact with its seat due to a defect of the downstream-positioned safety valve and when it is moved away from its seat under an increase in the upstream pressure exceeding the calibration pressure exerted by the spring washers.

More specifically in the isolating device of FIG. 2, disks 32 and 48 constitute pistons, each of which carries an annular gasket 68 cooperating with bore 30 so as to define a sealed chamber 70 filled with a hydraulic fluid such as jack oil. Chamber 70 communicates by passages 72 with an annular chamber 74 positioned above chamber 70 and within casing part 14. Chamber 74 is sealed in its upper part by a plate 76 in which are formed vent holes 78 which communicate with the atmosphere. The lower part of chamber 74 is filled with oil, as are the passages 72 which issue into the bottom of the chamber. The upper part of chamber 74 is filled with air and communicates with the atmosphere by vent holes 78. Thus, the lower third of chamber 74 can be filled with jack oil and has a free surface in contact with the air contained in the upper part. Finally, diaphragms 80 are arranged in the passages 72 in order to limit the oil flow rate between chambers 70 and 74.

The device described hereinbefore with reference to FIG. 2 constitutes a hydraulic shock absorber making it possible to eliminate swinging phenomena of valve 38 in the case of overpressures upstream of the isolating device 10 and after actuating the said device as a result of a failure of the downstream-positioned, not shown safety valve. Said swinging action, which is well known to the experts, occurs when the pressure upstream of a safety valve continually passes above the tripping or release threshold thereof as soon as the said valve closes.

The device of FIG. 2 damps the displacements of valve 38 and thus makes it possible to eliminate or at least reduce the said swinging actions. This damping is obtained by diaphragms 80 which prevent piston 32 and valve member 8 associated therewith from moving too rapidly within the bore 30, whilst limiting the speed of passage of oil between chamber 70 and chamber 74. Thus, if it is assumed that the pressure upstream of device 10 rises sufficiently to move valve member 38 away from its seat 24 counter to the force exerted by cupped washers 52 after actuating device 10 by means of the not shown motor, the resulting displacement of piston 32 leads to part of the oil in chamber 70 being passed into chamber 74 through passages 72. The pressure upstream of the device 10 then drops in such a way that valve member 38 tends to drop again towards its seat 24 under the action of cupped washers 52. However, this movement is decelerated because it requires an increase in the oil volume contained in chamber 70 requiring the passage of a certain volume of oil from chamber 74 to chamber 70 through diaphragms 80. Thus, the movement of valve member 38 is decelerated in such a way that it cannot engage with its seat 24 if the upstream pressure rises very rapidly. Thus, the swinging phenomenon is substantially eliminated.

Figure 3:
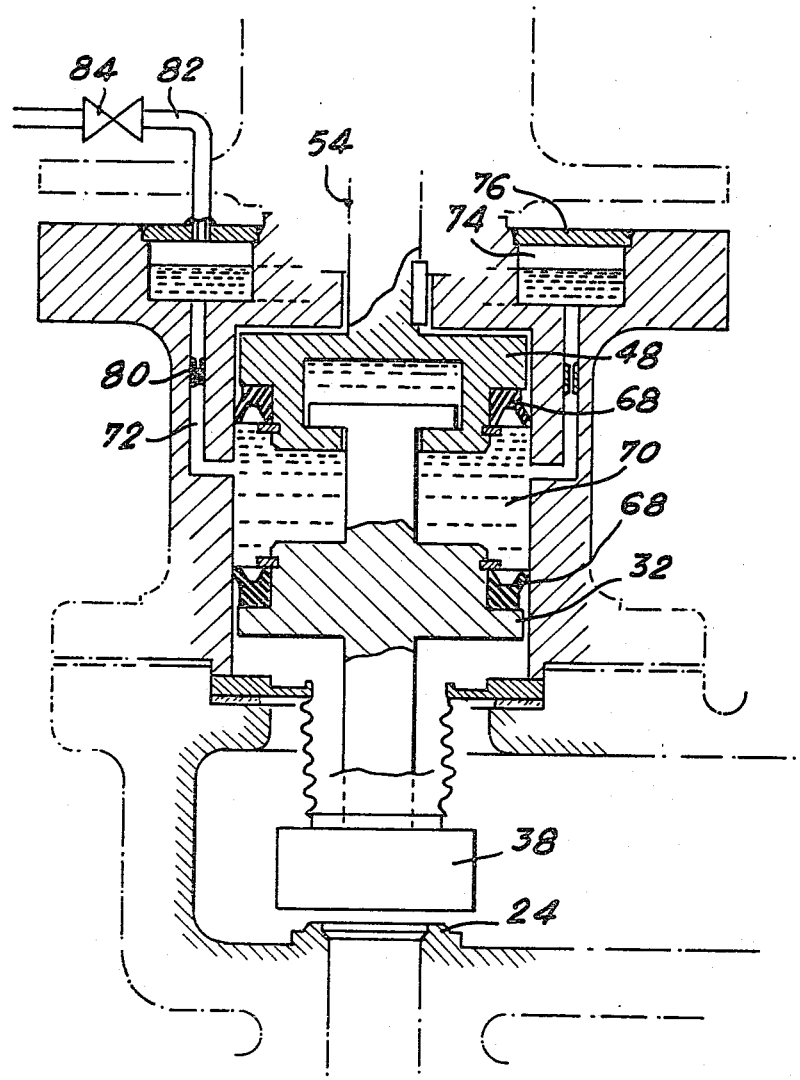
FIG. 3 a fragmentary longitudinal sectional a view comparable to FIG. 2 illustrating a second constructional variant of the invention in which the valve member is calibrated by pressurized gas acting via a hydraulic fluid.

The embodiment of FIG. 3 constitutes a constructional variant of FIG. 2 in which the cupped washers 52 ensuring the calibration of valve member 38 when the latter seals the valve seat 24 are replaced by a pressurization of the oil in chambers 70 and 74 fulfilling the same function.

More specifically, instead of communicating with the atmosphere by vent holes formed in plate 76 located in the upper part of chamber 74 as in the constructional variant of FIG. 2, annular chamber 74 communicates through plate 76 with a pipe 82 equipped with a filling valve 84. Thus, chamber 74 is completely sealed when the valve 84 is closed. Pipe 82 communicates with a compressed neutral gas source (not shown) in such a way that the upper part of chamber 74 is filled, e.g. up to half the total volume thereof with pressurized neutral gas by means of valve 84 which is then closed. This pressurized gas is in contact with the free surface of the oil contained in chamber 74 in such a way that it thus acts on the oil contained in chamber 70 to exert a predetermined calibration pressure on piston 32. The pressure of the gas introduced into the upper part of chamber 74 thus defines the tripping threshold of the safety valve constituted by valve member 38 and its seat 24 when the said valve is closed by the operation of the not shown motor as a result of a locking of the downstream-positioned safety valve in the open position. As in the variant of FIG. 2, diaphragms 80 placed in the passages 72 by which chamber 74 communicates with chamber 70 make it possible to ensure a dumping of the swinging actions of valve member 38. In this variant, the gaskets 68 associated with pistons 32 and 48 can optionally be replaced by a bellows.

Like the embodiment of FIG. 1, the embodiments of FIGS. 2 and 3 have the essential advantage of permitting a closure of the circuit, despite the locking in the open position of a downstream-positioned safety valve, thus constituting a protection for the said circuit against overpressures.

What is claimed is:

1. An isolating device for positioning in a circuit upstream of a safety valve, comprising a valve member which can sealingly bear on a valve seat formed in said circuit, neutralization means which normally maintain the valve member remote from its seat, said means being actuatable to bring the valve member in sealing engagement with its seat when it is necessary to isolate the safety valve and calibration means acting on the valve member when it is sealingly engaged with its seat to enable it to move away from the latter when the pressure upstream of the isolating device exceeds a predetermined value, said neutralization means comprising a mechanical system controlled by a motor, said mechanical system comprising a first member integral with the valve member and a second member which moves in accordance with the displacement direction of the valve member under the action of said motor, a connection with clearance being provided between said members in order to normally permit the second member to act on the first member so as to keep the valve member remote from its seat and to permit the first member to move with respect to the second member when the valve member moves away from its seat counter to the calibration means, when the pressure upstream of the isolating device exceeds the predetermined value after starting up the motor, each of said members comprising a part in the form of a piston sealingly received in a bore so as to define a first tight chamber filled with hydraulic fluid which communicates with a second tight chamber into which is introduced a given volume of compressed gas defining the calibration means.

2. An isolating device according to claim 1, comprising a hydraulic shock absorber acting on the valve member, at least when it is sealingly engaged with its seat.

3. An isolating device according to claim 2, wherein the first chamber communicates with the second chamber by means of at least one diaphragm.

* * * * *